United States Patent
Epstein (10) Patent No.: US 8,340,580 B1
(45) Date of Patent: Dec. 25, 2012

(54) METHOD AND APPARATUS FOR MANAGING COEXISTENCE INTERFERENCE

(75) Inventor: Bracha Epstein, Beit Shemesh (IL)

(73) Assignee: Marvell International Ltd., Hamilton (BM)

( * ) Notice: Subject to any disclaimer, the term of this patent is extended or adjusted under 35 U.S.C. 154(b) by 1128 days.

(21) Appl. No.: 12/235,418

(22) Filed: Sep. 22, 2008

Related U.S. Application Data (60) Provisional application No. 60/973,896, filed on Sep. 20, 2007, provisional application No. 60/973,905, filed on Sep. 20, 2007.

(51) Int. Cl.
*H04B 1/00* (2006.01)

(52) U.S. Cl. .................. 455/63.1; 455/73; 455/114.2

(58) Field of Classification Search .............. 455/63.1, 455/73, 114.2
See application file for complete search history.

(56) References Cited

U.S. PATENT DOCUMENTS

| | | | |
|---|---|---|---|
| 2002/0155811 A1 | 10/2002 | Prismantas et al. | |
| 2002/0196766 A1* | 12/2002 | Hwang et al. | 370/342 |
| 2006/0121853 A1 | 6/2006 | Madhaven et al. | |
| 2006/0252418 A1* | 11/2006 | Quinn et al. | 455/423 |
| 2007/0142067 A1* | 6/2007 | Cheng et al. | 455/512 |

OTHER PUBLICATIONS

U.S. Appl. No. 12/235,169, filed Sep. 22, 2008, in the name of Epstein.
U.S. Appl. No. 12/240,488, filed Sep. 29, 2008, in the name of Epstein et al.
Office Action mailed Jul. 21, 2011 in U.S. Appl. No. 12/240,488.

\* cited by examiner

*Primary Examiner* — Lana N Le
*Assistant Examiner* — Hsin-Chun Liao (57) ABSTRACT

The present disclosure provides for a wireless device that can include a transceiver that communicates with a network through an access point using a radio frequency (RF) signal on a channel. The RF signal propagates through an RF environment shared by multiple interference-susceptible wireless devices. The wireless device can also include an interference determination module that 1) detects a coexistence interference profile involving the wireless device and the multiple interference-susceptible wireless devices and 2) determines a channel change for the transceiver to communicate with the network. The wireless device can also include a channel adjuster that changes the channel accordingly to increase the integrity of signals of interference-susceptible wireless devices.

44 Claims, 7 Drawing Sheets

METHOD AND APPARATUS FOR MANAGING
COEXISTENCE INTERFERENCE

INCORPORATION BY REFERENCE

This application claims the benefit of U.S. Provisional Application No. 60/973,896, "WiFi Station Request for Change in AP Association Because of Coexistence Issues" filed on Sep. 20, 2007, and U.S. Provisional Application No. 60/973,905, "WiFi Station Reduces Transmit Power Because of Coexistence Issues" filed on Sep. 20, 2007, including all cited references, which are incorporated herein by reference in their entirety.

BACKGROUND

Wireless devices, such as a Bluetooth (BT) interface, a cell phone, a personal digital assistant (PDA), a global positioning system (GPS), and the like, may be active in a same environment, such as a shared RF environment. The wireless devices may be located on a platform, such as a mobile handset, a laptop computer, or other mobile device, or they may be located on different platforms in close proximity. For example, a mobile handset may contain a cell phone, a WiFi wireless device, and a BT adapter. In another example, a laptop computer may be in close proximity with a mobile handset. The laptop computer may include a WiFi wireless device and a BT interface. The mobile handset may include a cell phone and a BT interface. Operations of a wireless device may interfere with operations of the other wireless devices in the shared RF environment.

SUMMARY

The present disclosure provides a coexistence managed wireless device that can include a transceiver that can communicate with a network through an access point (AP) on a channel of a radio frequency (RF signal). The RF signal can propagate through an RF environment shared by multiple interference-susceptible wireless devices. The coexistence managed wireless device can also include an interference determination module that can 1) determine a coexistence interference involving the coexistence managed wireless device and other interference-susceptible wireless devices and 2) determine a channel change of the RE signal for the transceiver to communicate with the network. The wireless device can also include a channel adjuster that changes the channel accordingly to increase the integrity of signals received by an interference-susceptible wireless device.

The present disclosure can provide a method to mitigate coexistence interference. The method can include communicating with a network through an AP using a channel of an RF signal that propagates through an RF environment that is shared by multiple interference-susceptible wireless devices. The method can also include calculating a measure of the integrity of another RF signal that is transmitted between interference-susceptible wireless devices. The method can also include determining a channel change to communicate to the network and changing communication accordingly to increase the integrity of the RF signal that is transmitted between the interference-susceptible wireless devices.

The present disclosure can also provide a wireless communications controller that can include a wireless transceiver and a coexistence interference manager (CIM). The wireless transceiver can communicate with a network through an AP on a channel of an RF signal that propagates through an RF environment that is shared by multiple interference-suscep- tible wireless devices. The coexistence interference manager can include an interference determination module and a channel adjuster. The interference determination module can determine that the RF signal decreases a measure of the integrity of a second RF signal that is transmitted between interference-susceptible wireless devices. The interference determination module can also determine a channel change over which the wireless transceiver can communicate with the network with increased signal integrity.

Aspects of the disclosure can provide a wireless network that can manage coexistence interference. The wireless network can include a user equipment configured to detect coexistence interference and send a message indicative of a channel selection based on the detected coexistence interference. Further, the wireless network can include an access point configured to receive the message, and adjust a communication channel with the user equipment based on the channel selection.

The present disclosure can also provide devices and methods that can take into consideration the signal integrity of at least two RF signals in an RF environment. The methods and devices may select channel parameters, such as an access point association, that can optimize an experience of a user who uses devices that receive the at least two RF signals. Although the reception of any particular signal may not be maximized, a combined user experience metric for the user to simultaneously use several RF devices in the RF environment may be optimized.

BRIEF DESCRIPTION OF THE DRAWINGS

The disclosure will refer to the accompanying figures, wherein like numerals represent like elements, and wherein.

DETAILED DESCRIPTION OF EMBODIMENTS

Figure 1:
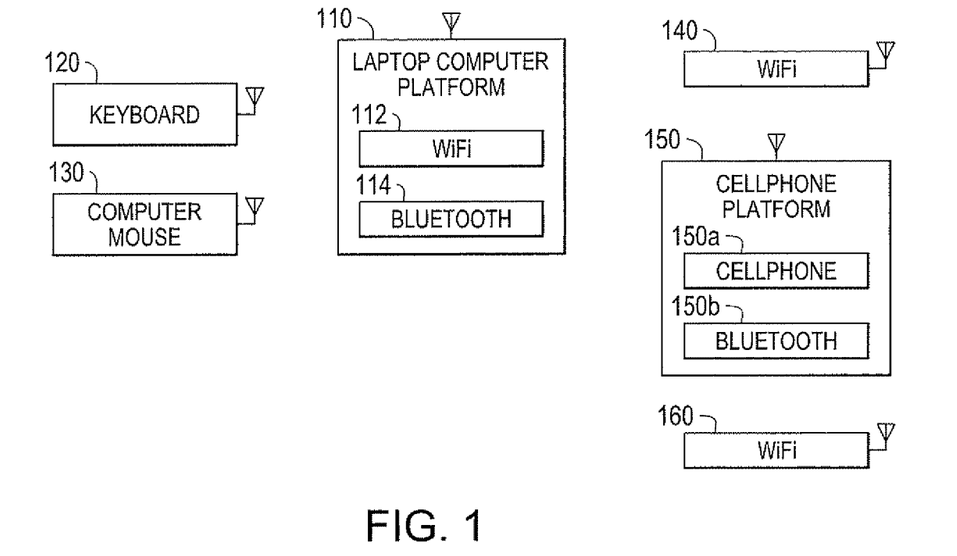
FIG. 1 is a configuration example of multiple wireless devices in a shared radio frequency (RF) environment.

FIG. 1 is a configuration example of multiple wireless devices in a shared radio frequency (RF) environment. The configuration 100 can include a laptop computer platform 110, a keyboard 120, a computer mouse 130, a cell phone platform 150, a WiFi device 140 and a WiFi device 160. The laptop computer platform 110 can communicate with the keyboard 120 and the computer mouse 130 over a shared RF environment. The cell phone platform 150 can include a cell phone device 150a, a Bluetooth (BT) device 150b, and other wireless devices.

The laptop computer platform 110 can include a WiFi device 112 and a BT device 114 that is co-located with the WiFi device 112, and other wireless devices. For example, the laptop computer platform 110 can include wireless devices such as a global positioning system (GPS), a ZigBee, a Wibree, a wireless USB device, an ultra-wideband (UWB) device, an EnOCean device, a 6loWPAN device, an iBurst device, and the like.

The WiFi device 112 can communicate with other WiFi devices, such as the WiFi device 140 and the WiFi device 160. For example, the WiFi device 140 can serve as an access point (AP) for the WiFi device 112, the WiFi device 160, and the like. An AP may enable one or more WiFi devices to communication with a network. The WiFi device 112 may interfere with the cell phone platform 150, the keyboard 120, the computer mouse 130, the cell phone device 150a, the BT device 150b, the co-located BT device 114, and the like. In other words, the WiFi 112 device can interfere with co-located wireless devices, such as the BT device 114 or external wireless devices.

It is noted that an AP may operate according to different standards. For example, an AP of 802.11 may include interfaces a/b/g. Different interfaces may be considered as different wireless devices and different communication channels for this disclosure.

Figure 2:
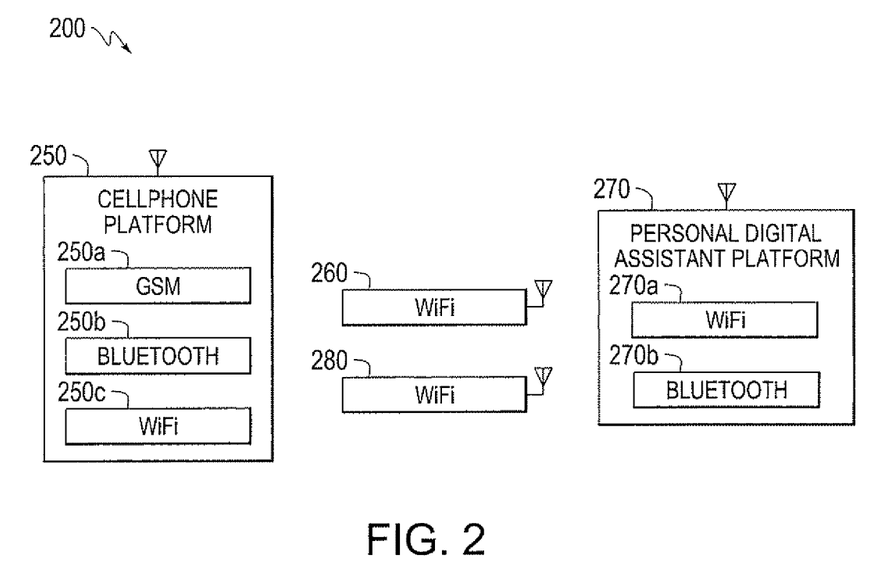
FIG. 2 is another configuration example of multiple wireless devices in a shared RF environment.

FIG. 2 shows another configuration example of multiple wireless devices in a shared RF environment. The multiple wireless devices can include a cell phone platform 250, a WiFi device 260, a personal digital assistant platform (PDA) 270, and a WiFi device 280. The cell phone platform 250 can include a GSM cell phone device 250a, a BT device 250b, and a WiFi device 250c. The PDA platform 270 can include a WiFi device 270a and a BT device 270b.

Any of the WiFi device 250c, WiFi device 260, WiFi device 270a, or WiFi device 280 can serve as an AP. For example, the WiFi device 250c may use the WiFi device 260 as an AP. The WiFi device 270a can use the WiFi device 280 as an AP. In another example, the WiFi device 250c, the WiFi device 270a, and the WiFi device 260 can use the WiFi device 280 as an AP. An AP may enable one or more wireless devices, such as WiFi devices, to communicate with a network.

In operation, RF signals from any of the WiFi devices in the configuration 200 can interfere with other WiFi devices, or non-WiFi devices, and non WiFi devices may interfere with each other. For example, the WiFi device 250c, the WiFi device 260, the WiFi device 270a, and the WiFi device 280 can interfere with each other, or with the GSM cell phone device 250a, the BT device 250b, the BT device 270b, or with other wireless devices.

Figure 3:
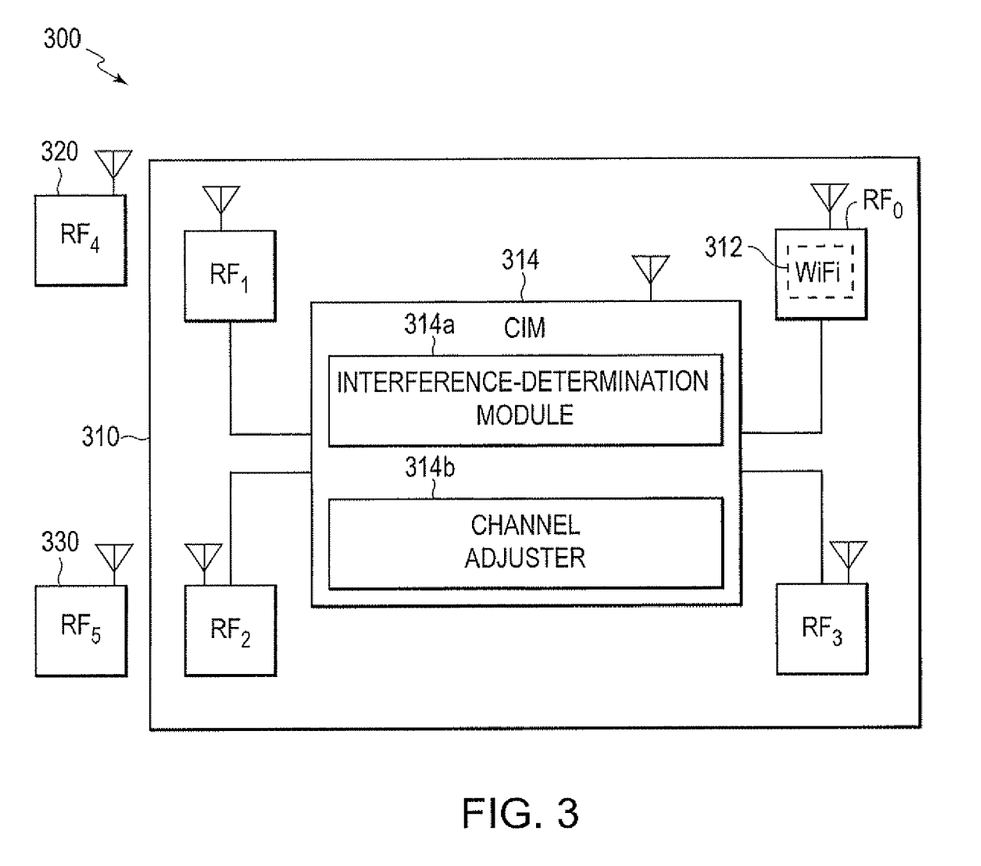
FIG. 3 is an example of a coexistence interference managed network according to an embodiment.

FIG. 3 shows a diagram example of a coexistence interference managed network 300. The coexistence interference managed network 300 may include a plurality of platforms, such as a platform 310, a platform 320 and a platform 330. Each platform may include one or more wireless devices. For example, the platform 310 may include $RF_0$-$RF_3$, the platform 320 may include $RF_4$, and the platform 330 may include $RF_5$. The wireless devices of the plurality of platforms may share an RF environment. Additionally, at least one of the platform, such as the platform 310, may include a coexistence interference manager (CIM) 314. The CIM 314 may manage the shared RF environment to improve an overall user experience.

The wireless devices $RF_0$-$RF_5$ can include various wireless devices, such as a cellular telephone, a global positioning system (GPS), a BT device, a WiFi device, and the like. For example, $RF_0$ may be a WiFi device 312, such as an interface that adheres to an IEEE 802.11 specification, and $RF_4$ may be a BT device, such as a wireless earphone that adheres a Bluetooth standard.

The CIM 314 can be a module within a communication coordination manager (CCM), an application processor, and the like. The CIM 314 may be included in a separate processor such as a dedicated processor, a central processing unit (CPU), a digital signal processor (DSP), and the like. The CIM 314 may detect interference, and may result in communication parameter changes, such as channel change, interface change, with regard to the detected interference.

The CIM 314 can use various techniques to detect the interference. In an example, the CIM 314 may include a look-up table to determine interference. The CIM 314 may know the status of the wireless devices, for example from the CCM that can obtain the status of the wireless devices. Further, the CIM 314 may refer a look-up table according to the status of the wireless devices to determine a coexistence interference profile.

The CIM 314 can include a determination module, such as an interference determination module 314a in FIG. 3, that can detect interference. In an example, the interference determination module 314a can measure and calculate diverse RF signal characteristics for the various wireless devices $RF_0$-$RF_3$. For example, the interference determination module 314a can compute a power spectral density (PSD) or a power spectrum, analyze time domain parameters, perform a channel quality measurement, compute a signal-to-noise ratio (SNR) measurement, and the like, to characterize or quantify the RF signals transmitted from the various wireless devices. The CIM 314 may detect interference based on the calculated characteristics.

In another example, the interference determination module 314a may determine interference from information, such as packet success rate, throughput, and the like, of a higher RF communication layer. Additionally, the interference determination module 314a may determine interference based on interference knowledge of the platform 310 or nearby platforms.

Additionally, the CIM 314 may include a channel adjuster 314b. The channel adjuster 314b can result in channel change to improve the user experience. It is noted that the channel may broadly include any transmitting characteristics, such as timeslot, frequency band, code-space, WiFi interface, and the like. More specifically, the channel adjuster 314b can result in a positive channel selection that can indicate a preferred channel, or a negative channel selection that can indicate an undesired channel. For example, the channel adjuster 31413 may adjust or change the channel of a WiFi device, such as $RF_o$, to reduce coexistence interference between the WiFi device and other wireless devices. More specifically, the channel adjuster 314b can send a request message to indicate a preferred channel or an undesired channel.

Various coexistence interference may exist. For example, the $RF_0$-$RF_3$ which are co-located within the platform 310 may mutually interfere with each other. For another example, the wireless device $RF_4$ of the platform 320 may cause coexistence interference to one or more wireless devices within the platform 310. The wireless device $RF_4$ may also be subject to interference from the platform 310, such as the WiFi device 312. The CIM 314 may determine that the wireless device $RF_4$ is active by obtaining RF measurements, for example via $RF_1$. The CIM 314 may result in wireless devices characteristic change, such as channel change to reduce or mitigate coexistence interference. For example, the CIM 314 may result in channel change of the WiFi device 312 to reduce or mitigate coexistence interference.

According to an aspect of the disclosure, the CIM 314 may manage the shared RF environment to improve an overall user experience of a user who uses several wireless devices concurrently. For example, a user may use a cell phone platform, which may include a cell phone device and a Bluetooth device. The user may use a Bluetooth earpiece to take a phone call. Thus, both the cell phone device and the Bluetooth device can be operative concurrently, and may interfere each other. The interference may result in a reduced user experience metric, such as high noise, and the like. The CIM 314 may detect the interference and may adjust at least one communication parameter for at least one of the cell phone device and the Bluetooth device to mitigate the interference. Therefore, the phone call quality or the overall user experience metric can be improved. However, RF integrity for any particular RF device involved may not be maximized.

Figure 4:
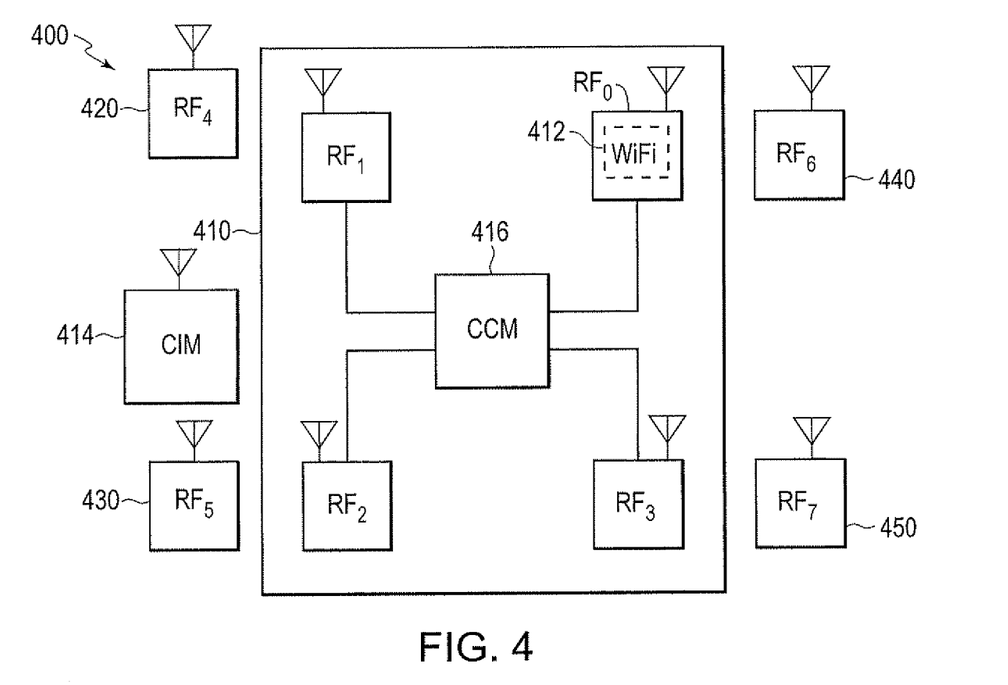
FIG. 4 is another example of a coexistence interference managed network according to an embodiment.

FIG. 4 shows another diagram example of a coexistence interference managed network 400. The coexistence interference managed network can include a plurality of platforms, such as 410, 420, 430, 440 and 450. Additionally, the coexistence interference managed network 400 may include a CIM 414 that can be external to the plurality of platforms. Devices in FIG. 4 which correspond to devices in FIG. 3 are labeled with corresponding numbers.

Each platform may include one or more wireless devices. For example, the platform 410 may include wireless devices $RF_0$-$RF_3$. The wireless devices $RF_0$-$RF_3$ may include various wireless devices. Additionally, the platform 410 can include a CCM 416 that can interface with and manage the wireless devices $RF_0$-$RF_3$, and other coupled wireless devices. According to an aspect of the disclosure, the CCM 416 can receive status change of the wireless devices that are coupled to the CCM 416, and may detect coexistence interference based on the status change. Thus, the coexistence interference can be detected without communication between the wireless devices. Additionally, the CCM 416 may instruct the wireless devices to mitigate the coexistence interference. For example, the CCM 416 can turn a wireless device on or off, enable or disable transmission of an RF signal from a wireless device, detect the activity of a wireless device, such as RF transmission, RF reception, digital processing, analog processing, voltage levels, current levels, and the like. The CCM 416 can allocate platform resources such as memory, communications paths, processor cycles, and the like that may be needed to manage communication to and from the platform 410.

The CIM 414 may be externally located with respect to platform 410. For example, CIM 414 may be located in an AP, a base station (BS), or other wireless device, platform, or system. In another example, the CIM 414 can be included in the external device 420, such as a WiMax device, a BT device, and the like. The CIM 414 may be part of a system, such as a distributed processor, for detecting and managing coexistence interference to wireless devices on the platform 410 or within RF communications range of the platform 410. For example, CIM 414 can tabulate the susceptibility of each wireless device to interference from neighboring wireless devices and may send commands to platform 410, for example to change the WiFi 412 channel or interface and AP association.

Figure 5:
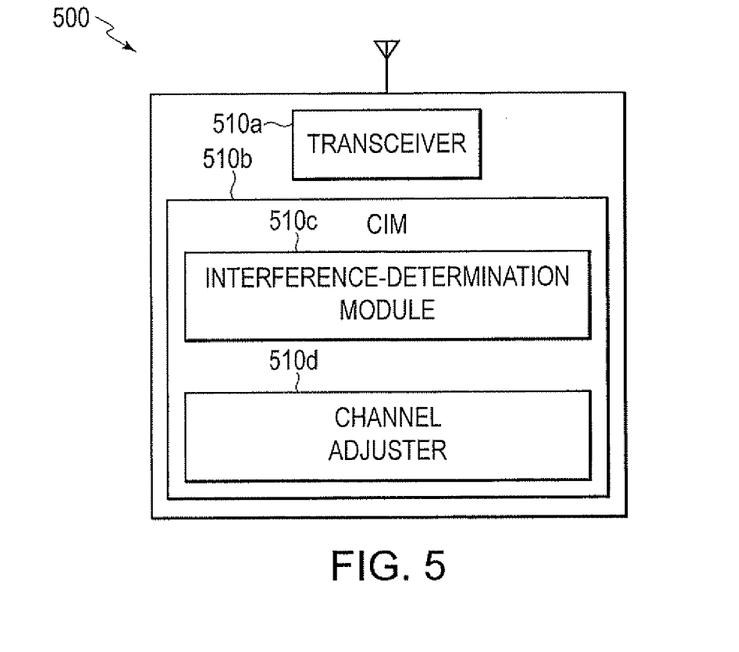
FIG. 5 is an example of a wireless device that includes a transceiver and a coexistence interference manager (CIM) according to an embodiment.

FIG. 5 shows an example of a wireless device 500 that can include a transceiver 510a and a CIM 510b. The transceiver 510a can be a cell phone, a BT interface, a WiFi interface, or other wireless device. The CIM 510b can be a device that performs the function of CIM 314 or CIM 414, described with respect to FIGS. 3 and 4, respectively. It is noted that the device 500 may be an instance of the wireless devices $RF_0$-$RF_7$, and the like. In other words, the functions of CIM 314 or CIM 414 may be subsumed in the wireless device 500.

The CIM 510b can account for the susceptibility of the transceiver 510a to coexistence interference and the strength or tendency of the transceiver 510a to cause coexistence interference at other nearby RF devices. Additionally, the CIM 510b may instruct a channel change. For example, when the transceiver 510a is a WiFi device, such as the WiFi device 312 or WiFi device 412, the CIM 510b can change a WiFi channel and an AP association of the wireless device 500 to mitigate coexistence interference to other wireless devices or caused by other wireless devices. It is noted that a channel change may include a parameter change in a physical channel, a change in an interface, such as 802.11 a/b/g, and the like.

Figure 6:
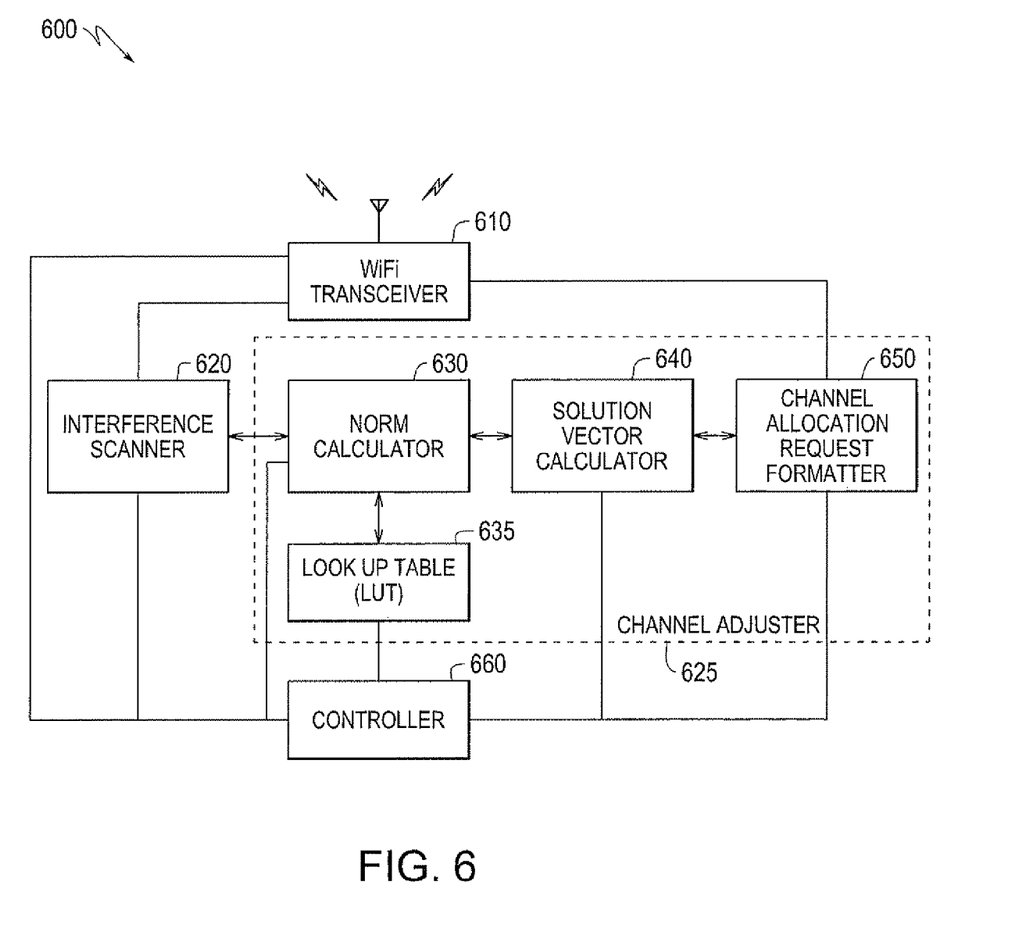
FIG. 6 is an example of a coexistence interference managed WiFi device according to an embodiment.

FIG. 6 shows a wireless device example 600 that can include a WiFi transceiver 610, an interference scanner 620, a norm calculator 630, a look-up table (LUT) 635, a solution vector calculator 640, a channel allocation request formatter 650, and a controller 660. These elements can be coupled together as shown in FIG. 6. The WiFi transceiver 610 can transmit and receive WiFi signals over a common or shared RF environment using signals that comply with WiFi standards. For example, the WiFi transceiver 610 can transmit and receive signals in a 2.4 GHz band, a 5 GHz band, and the like.

The controller 660 may couple control and command signals to and receive data from: the WiFi transceiver 610, the interference scanner 620, the norm calculator 630, the solution vector calculator 640, the channel allocation request formatter 650, and the LUT 635. The WiFi transceiver 610 may be coupled to the interference scanner 620 and the channel allocation request formatter 650. The interference scanner 620 may be coupled to the norm calculator 630. The norm calculator 630 may be coupled to the solution vector calculator 640, which may be coupled to the channel allocation request formatter 650. The norm calculator 630 may be coupled to the LUT 635.

The interference scanner 620 may request the WiFi transceiver 610 to provide signals or samples from the RF environment. For example, the interference scanner 620 may command the WiFi transceiver 610 to tune RF filters, tune RF oscillators, sample data packets, apply chip or pseudo-noise (PN) de-spreading codes, sample a down-converted signal, and the like. The interference scanner 620 may act as an RF spectrum analyzer, a sampling oscilloscope, a time-domain analyzer, a packet analyzer, a polarimeter, and the like. In other words, the interference scanner 620 may act to separate or orthogonalize samples of signals from a commonly shared RF environment. Orthogonal signals can include signals in separate frequency bands, non-overlapping time slots, and the like. The interference scanner 620 may scan the RF environment and aggregate an analysis of the scan into a dataset that is transmitted to the norm calculator 630.

It is noted that other suitable interference determination techniques other than measuring and analyzing RF signals in the RF environment by the interference scanner 620 can be suitably used in the wireless device 600. Such suitable interference determination techniques may include analyzing communication parameters from higher communication layers, such as packet success rate, throughput and the like, analyzing platform status which may include status of various wireless devices on the platform or nearby platform, and the like.

The norm calculator 630 can determine an interference norm or metric that determines the degree of coexistence interference to RF signals received by wireless devices in the shared RF environment. The norm calculator 630 may extract LUT values from the LUT 635. The norm calculator 630 can read the LUT values and divide the scan data provided by interference scanner 620 into data cells that correspond to interfering or potentially interfering permutations, i.e., order-dependent combinations, of wireless devices. For example, the LUT 635 may provide information on the susceptibility of a GSM cell phone to interference by the WiFi transceiver 610, which can usually differ from the susceptibility of the WiFi transceiver 610 to interference by the GSM cell phone. Other factors that may be considered to determine the interference metric may include channel allocation, transmitting power, receiving power, and permutations of those factors. The norm calculator 630 may analyze the data cells of interfering permutations to determine a metric, such as a worst-case or L1 norm, a square-law or L2 norm, and the like. In other words, the noon calculator 630 may calculate a metric for one or more potentially interfering or currently interfering permutations of wireless devices. The norm calculator 630 can output the norm or interference metric, a set of identifiers for interference-causing and interference-susceptible devices, and other interference data to the solution vector calculator 640.

The metric may be based on an optimization of an overall user experience of a user who is concurrently using several wireless devices, not based on an optimization of a single wireless device. Therefore, the integrity of any signal RF signal may be less than maximum, but a metric of several devices may be optimized for concurrent use.

The solution vector calculator 640 may search for an AP association that mitigates or reduces coexistence interference to other wireless devices by the WiFi transceiver 610. For example, the solution vector calculator 640 may determine that the WiFi transceiver 610 should change a channel and an AP association to prevent or mitigate interference to external or co-located wireless devices by the WiFi transceiver 610.

The solution vector calculator 640 may also determine that a channel change or a change in AP association can resolve interference on the WiFi transceiver 610 by another wireless device. In other words, the solution vector calculator 640 can determine a best AP association or channel to mitigate coexistence interference either 1) to the WiFi transceiver 610 or 2) caused by the WiFi transceiver 610. The solution vector calculator 640 can provide a recommended AP association or channel change request to the channel allocation formatter 650.

The channel allocation request formatter 650 can request the WiFi transceiver 610 to change a WiFi channel. For example, the channel allocation request formatter 650 may request that the WiFi transceiver 610 change from channel 11 to channel 13.

The controller 660 may send command and control signals to the interference scanner 620 or other interference determination modules, the norm calculator 630, the solution vector calculator 640, the channel allocation request formatter 350, and the WiFi transceiver 610. The controller 660 may send predetermined or calculated data on the coexistence interference strength, coexistence interface susceptibility, and other parameters for pairs and higher order permutations of wireless devices. For example, the controller 660 can store information in the LUT 635 on the strength and susceptibility information for a pair consisting of a cell phone and a WiFi.

The controller 660 may determine a time to scan, a scan rate, a scan frequency band, a de-spreading code search sequence, and the like to configure the interference scanner 620. For example, the controller 660 may command the interference scanner 620 to scan available WiFi channels, frequency bands, and the like.

The controller 660 may command the solution vector calculator 640 to iterate to determine a best or recommended solution vector, a next-best solution vector, and the like. For example, the channel allocation request formatter 650 may receive an indication that the WiFi transceiver 610 or another wireless device has rejected the mitigation request. The channel allocation request formatter 650 may obtain the next-best solution vector from the solution vector calculator 640 and make a subsequent or follow-up request. In other words, the controller 660 may command the solution vector calculator 640 to search for a sequence of solutions. The sequence may be established by a constraint provided by the controller 660, such as a constraint that a previous channel allocation or AP association request was rejected.

Figure 7:
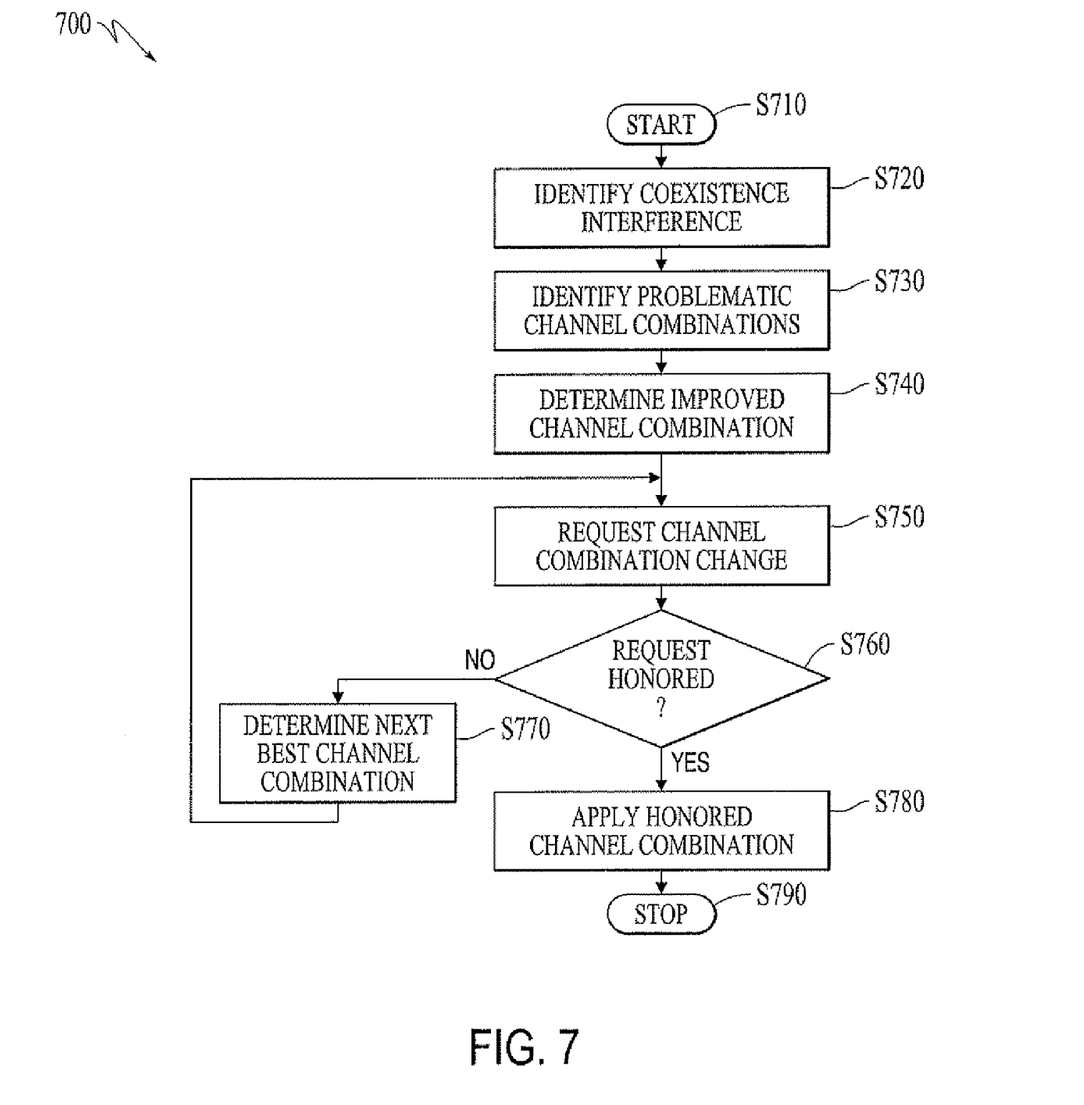
FIG. 7 is a flowchart outlining a process example for managing coexistence interference according to an embodiment.

FIG. 7 shows a flowchart outlining a process example to resolve or mitigate coexistence interference. The process starts at step S710 and proceeds to step S720 in which coexistence interference can be identified. The coexistence interference may exist between various wireless devices, such as from cell phone device to WiFi device, from WiFi device to cell phone device, from WiFi device to BT device, from BT device to WiFi device, from cell phone device to BT device, from BT device to cell phone device, etc. The coexistence interference may be identified by various techniques, such as by measuring RF signals, by analyzing information from higher communication layers, by analyzing status of various wireless devices, and the like. In an embodiment, a WiFi-enabled platform can identify a coexistence interference problem between different wireless devices. For example, the WiFi-enabled platform can identify a problem in a cell phone connected to a laptop. The cell phone can include a transmitter and receiver, another WiFi or BT device, and the like. The cell phone may interfere with BT device or vice-versa. The WiFi enabled platform may identify problems by, for example, by measuring or calculating signal quality metrics, signal-to-noise ratios, signal-to-interference ratios, parity bits, check bits, and the like. Then, the process proceeds to step S730.

In step S730, a problematic channel combination can be identified. In an example, the process can identify time slots or frequencies that the wireless devices can interfere or compete with each other. The process may refer to tabulated or predetermined combinations that can interfere, compare interference strength and susceptibility, and the like. Step S720 may be distinguished from step S730 in that step S720 can include measurements and data reduction, whereas step S730 can involve looking up potentially problematic permutations or qualifying the potential for interference for pairs, triplets or higher order permutations of wireless devices, and the like from the measurements. Then, the process proceeds to step S740.

In step S740, the process may determine one or more channel combinations that may resolve or ameliorate the coexistence interference. The one or more channel combinations may achieve a maximal signal integrity for a single device, or may achieve an optimal user experience among several devices that may interfere with each other. For example, a WiFi-enabled platform that is equipped with a GSM cell phone and a WiFi device can determine that a remediating combination would involve notifying a cellular network of coexistence interference, or making a network channel request, so that the cellular network may command the platform to change the GSM band used by the cell phone, or switching to a different WiFi channel or interface. Then, the process proceeds to step S750.

In step S750, the process may request the network to change a channel combination. For example, a WiFi-enabled platform can request that a remediating combination of channels be used for future communications to and from the WiFi-enabled platform. Then the process proceeds to step S760.

In step S760, the process can receive and analyze a reply from the managed network. For example, the process can determine if the managed network has honored the request for a change in a combination of channels used by the devices in the WiFi-enabled platform. If the request is not honored, the process can proceed to program step S770, otherwise process can proceed to step S780.

In step S770, the process can determine a next-best remediating combination. For example, the process may determine that the next-best combination can include a positive request for a specific channel or range of channels, or a negative request that may exclude a specific channel or range of channels.

In step S780, the process can apply the approved or honored channel permutations. For example, the WiFi-enabled platform can change parameters such as time slots, frequencies, CDMA codes, and the like used by one or more wireless devices to de-conflict use of the shared RF environment, thereby reducing or mitigating coexistence interference. Then, the process proceeds to step S790 and stop.

It may be noted that a request to change a channel combination can be made either before or during a communication session. For example, if a WiFi-enabled platform senses that a coexistence interference problem may arise during a telephone call, the WiFi-enabled platform may make a request to change a channel allocation or channel combination to the managed network, or send a message indicative of the coexistence interference, so that a channel allocation decision can be made. The process may make the request either before or during the call. A base station in the managed network can make a de-conflicting change in channel allocation for the requesting process and can apply the change either at a given time or based on an event within the managed network. For example, the managed network can switch the WiFi-enabled platform to the GSM band at 1800 or 1900 MHz rather than the 850 MHz when the WiFi-enabled platform requests a change to de-conflict interference between a GSM and WiFi. In another example, the managed network may request that the WiFi-enabled platform switch GSM bands when another WiFi-enabled platform exits a call or becomes inactive.

It is noted that the GSM example is illustrated for ease and clarity, the disclosed method and apparatus may be suitably adjusted for managing coexistence interference in other communication standards.

Figure 8:
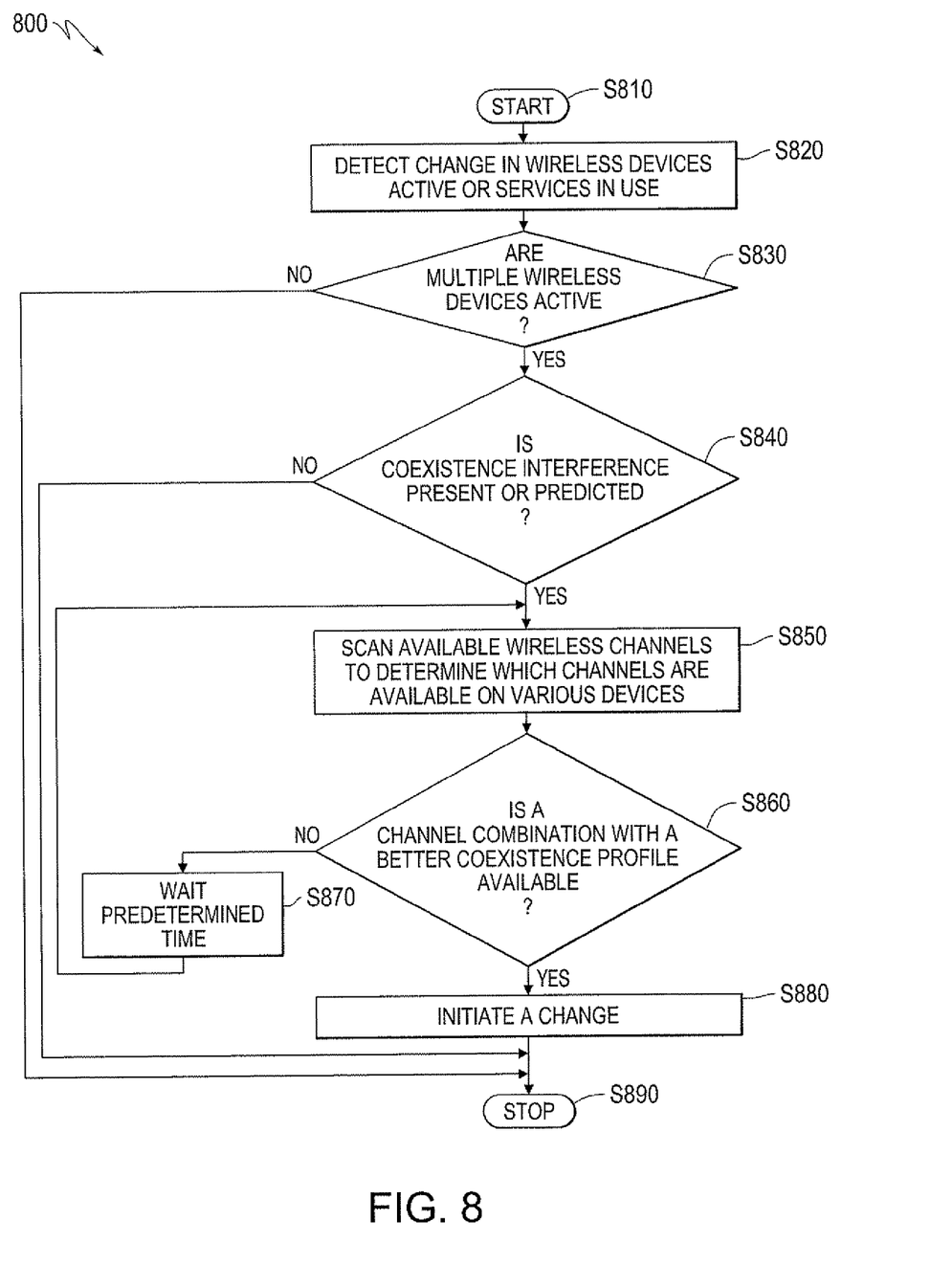
FIG. 8 is a flowchart outlining a process example for changing a channel in a wireless device according to an embodiment.

FIG. 8 shows a flowchart outlining a process example that can initiate a channel change, specifically an access point (AP) change, in a WiFi-enabled platform according to an embodiment. The process can change an AP association because of coexistence issues. For example, the process may request a change in the number of wireless devices that are active or which services are used by the wireless devices.

The process can start at step S810 and can proceed to step S820. In step S820, the process can sense a change, such as an activity change, service change, and the like. More specifically, the WiFi-enabled platform that is operating in the same vicinity as other devices can sense a change of wireless device activities or services in use. For example, the WiFi-enabled platform may contain a WiFi receiver and transmitter that may detect interference from either external user equipment (UE) or from devices that are co-located in the given WiFi-enabled platform. In another example, the WiFi-enabled platform may include one or more phone radios, such that step S820 may determine that enabling the one or more phone radios on specific bands may interfere with WiFi reception.

In yet another example, the WiFi-enabled platform may determine that adjacent or nearby UEs may include wireless devices or radios that can interfere. In other words, the WiFi-enabled platform or wireless station can determine that the current WiFi communication environment may not meet user service requirements or may degrade in such a fashion that user service requirements are likely to be degraded in a future predicted interval. The WiFi station can use service quality assessments or service quality predictions to request channel changes that resolve or mitigate potential interference among various interference susceptible devices. Then, the process proceeds to step S830.

In step S830, the process can determine if the plurality of wireless devices that are interference susceptible are active or will be active. For example, the step S830 can determine if a WiFi device will be powered on within 2 seconds. If not, process can proceed to step S890, otherwise process can proceed to step S840.

In step S840, the process can determine that wireless communication traffic of the platform is either presently or is predicted to be either a source of interference or subject to interference by another device. In other words, step S840 can indicate a coexistence interference problem. The process can measure the present signal quality statistics, calculate predictive signal quality statistics, or use other metrics to assess the communications environment. For example, the process can use a channel quality indicator (CQI), a signal-to-noise ratio (SNR), a signal-to-interference ratio (SIR), and the like to make a signal quality assessment. If, in step S840, the process determines that the interference due to wireless communication traffic either does not or will not degrade service quality, process can proceed to step S890, otherwise process can proceed to step S850. For example, the process may determine that interference power in a given frequency band is below a threshold.

In step S850, the process can scan available wireless channels in one or more interference susceptible devices and determines which channels are available. The process can scan all available bands, frequencies, interface and channels in the WiFi device and all the phones, for example. For example, the process can scan the bands first, then the channels within each band, then proceed to the next band until all bands have been scanned. For example, in an 802.11 b/g WiFi-enabled platform that executes the process can scan from channel 1 to channel 13 inclusive. Then, the process proceeds to step S860.

In step S860, the process can determine if a channel combination with a better coexistence profile is available. Channel combinations for several devices that can provide better coexistence profiles may be selected. It is noted that sometimes a single channel change may provide a better coexistence interference profile. For example, a different WiFi access point (AP) association with an improved, remediating, or mitigating coexistence profile may be available. The better coexistence profile can be evaluated by various metrics. In an example, the coexistence profile may include maximum transmitter strength, minimum transmitter strength, interference susceptibility, and the like. In another example, the better coexistence profile can be evaluated based on a metric for determining overall user experience of concurrently using multiple wireless devices. The process may include consistency checks in the remediating coexistence profile that meets other user preferences. For example, the process can determine that a coexistence profile or channel combination is available from an AP which is different from the AP with which the WiFi-enabled platform is currently associated. The process may refer to tables of user preferences, such as WiFi-enabled platform settings or parameters that provide information on the configuration of devices within the WiFi-enabled platform. If, in step S860, the process determines that no channel combinations with a better coexistence profile is available, then process can proceed to step S870, in which the WiFi-enabled platform can wait a given or predetermined period of time.

In step S870, the process can wait for a predetermined interval, such as a default waiting period preprogrammed by a mesh network of APs, a hardware-default waiting period determined by a device manufacturer, and the like. Then, the process returns to step S850.

If, in step S860, the process determines that a new channel combination, such as a different WiFi AP association, with a better coexistence profile is available, then process can proceed to step S880 in which the process can command the WiFi-enabled platform to switch to the new channel combination. For example, the WiFi-enabled platform can switch to a different set of frequencies used by the serving AP. In another example, the WiFi-enabled platform can initiate a change to a new AP association that resolves coexistence issues. It is noted that the channel change may include changes at the WiFi device, other devices, or both.

Figure 9:
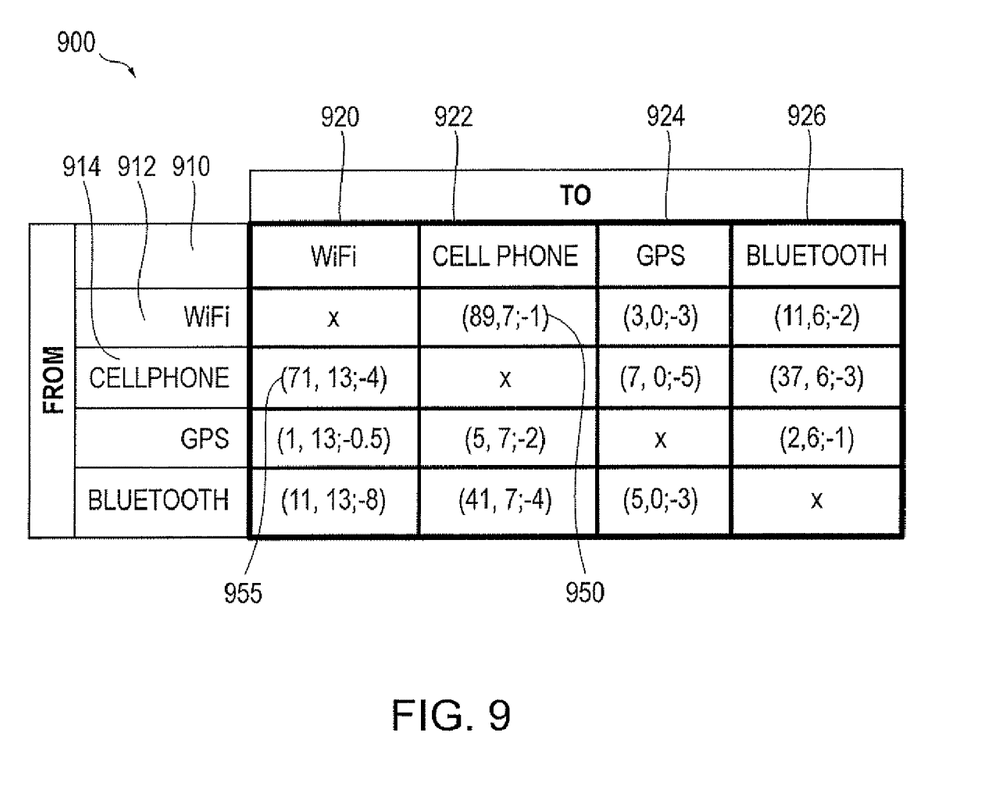
FIG. 9 is a data structure example for interference strength and susceptibility according to an embodiment.

FIG. 9 shows a coexistence profile data structure example 900. The coexistence profile data structure 900 can be used to determine coexistence interference between a pair of wireless devices, and can provide information for determining channel association to mitigate the coexistence interference. The coexistence profile data structure can include a transmitting device type column 910 and receiving device columns 920, 922, 924, and 926 corresponding to a WiFi, a cell phone, a GPS, and a BT device, respectively. The coexistence profile data structure 900 may be understood in terms of a row and column structure in which a transmitting unit within a platform, such as coexistence-managed platform 310, can transmit an RF signal that may interfere with a cell phone, a GPS, and a BT device, respectively. In other words, coexistence profile data structure 900 may quantify interaction parameters and interaction strategies that mitigate coexistence interference. For example, row 912 and column 922 may quantify the interaction of a WiFi and a cell phone using a set of coexistence parameters. For example, the intersection of row 912 and column 922 may be used to find a profile parameter vector 950 that quantifies 1) the cell phone susceptibility to interference by the WiFi, 2) a cell phone transmitter strength parameter, 3) an adjustment or convergence parameter, and other parameters.

The susceptibility parameter of the profile parameter vector 950 can quantify the susceptibility of the cell phone to interference by the WiFi. The strength parameter of the coexistence profile parameter vector 950 can quantify the strength of the wireless device, such as a maximum power in dBm, signal strength in normalized units, and the like. The convergence parameter of the coexistence profile parameter vector 950 can quantify a convergence rate, step size, and the like. For example, the convergence parameter can be a desired decrement in a transmitter power, a rate of decrease in a signal to interference ratio, and the like. In a related example, a cell phone that uses the coexistence profile data structure 900 and is parameterized by the profile parameter vector 950 may have 89 units of susceptibility to a WiFi, may transmit 7 units of power, and may benefit by decrementing the WiFi power by 1 dB per iteration in a coexistence-interference mitigation loop, such as the step S842 described with respect to FIG. 8.

Similarly, the coexistence profile parameter 955 can quantify the susceptibility, strength, and adjustment strategy or parameters for a WiFi when subjected to interference by a cell phone. However, the effects of coexistence interference need not be symmetrical. For example, as indicated by the intersection of row 914 and column 920, a cell phone may transmit a signal that causes coexistence interference or to a WiFi. The WiFi may exhibit 71 normalized units of susceptibility to the cell phone based interference, may output a signal at 13 dBm, and may benefit by a 4 dB reduction in cell phone power per loop or iteration when such coexistence interference is detected.

While the invention has been described in conjunction with the specific exemplary embodiments thereof, it is evident that many alternatives, modifications, and variations will be apparent to those skilled in the art. Accordingly, embodiments of the invention as set forth herein are intended to be illustrative, not limiting. There are changes that may be made without departing from the spirit and scope of the invention.

What is claimed is:

1. A wireless device, comprising:
a transceiver that communicates with a network through an access point using a first radio frequency (RF) signal on a channel, the first RF signal propagating through an RF environment shared by a plurality of interference-susceptible wireless devices, the transceiver configured to communicate with a single centralized coexistence interference manager (CIM) that is configured to coordinate interference among the interference-susceptible wireless devices;
an interference determination module configured to determine that the first RF signal decreases a signal integrity metric for a second RF signal transmitted from a first to a second interference-susceptible wireless device and determine a channel change over which the transceiver can communicate with the network; and
a channel adjuster configured to change the channel according to the determined channel change to increase the signal integrity metric so that an access point signal quality exceeds a minimum access point signal quality.

2. The wireless device of claim 1, wherein the interference-susceptible wireless devices include at least one of a cell phone, a WiFi device, a WiMAX device, a Bluetooth (BT) device, a Wibree device, a ZigBee device, a Wireless USB device, an ultra-wideband (UWB) device, an EnOCean device, a 6loWPAN device, an iBurst device, and a global positioning system (GPS).

3. The wireless device of claim 1, wherein the transceiver includes a WiFi transceiver.

4. The wireless device of claim 1, wherein the channel is at least one of a frequency band, a timeslot, a transmission time interval, and a code-space.

5. The wireless device of claim 1, wherein the signal integrity metric is at least one of a data retransmission probability, a signal-to-noise ratio, a throughput, a time delay profile, and a signal-to-interference ratio.

6. The wireless device of claim 1, wherein the access point signal quality is at least one of a packet retransmission probability, a bit error ratio, a parity bit, a checksum, a signal-to-noise ratio, a throughput, a packet error rate, a delay profile, and a signal-to-interference ratio.

7. The wireless device of claim 1, wherein the wireless device includes a cell phone of at least one of a GSM device, a UMTS device, a PCS device, a long term evolution (LTE) device, a global packet radio system (GPRS) device, an EDGE device, a 1xRTT device, an evolution data only (EV-DO) device, and a code-division multiple access (CDMA) device.

8. The wireless device of claim 1, wherein the first RF signal includes a data packet.

9. The wireless device of claim 8, wherein the channel adjuster is further configured to change the channel before the transceiver transmits the data packet.

10. The wireless device of claim 8, wherein the channel adjuster is further configured to change the channel while the transceiver transmits the data packet.

11. The wireless device of claim 1, wherein the second RF signal includes an incoming data packet.

12. A platform that includes the wireless device of claim 1.

13. The platform of claim 12, wherein the transceiver is a WiFi device and the first interference-susceptible device is at least one of cell phone, a WiFi device, a WiMAX device, a Bluetooth (BT) device, a Wibree device, a ZigBee device, a Wireless USB device, an ultra-wideband (UWB) device, an EnOCean device, a 6loWPAN device, an iBurst device, and a global positioning system (GPS).

14. The wireless device of claim 1, wherein the channel change includes at least one of an access point change, physical channel change, and access point interface change.

15. The wireless device of claim 1, wherein the channel adjuster is further configured to adjust a channel based on a user experience metric for a combined experience of concurrently using multiple mutually interfere-able wireless devices.

16. A method of selecting a wireless access point, comprising:
communicating with a network using a first radio frequency (RF) signal on a first channel of an access point, the first RF signal propagating through an RF environment shared by a plurality of interference-susceptible wireless devices;
calculating a signal integrity metric of a second RF signal transmitted from a first interference-susceptible wireless device to a second interference-susceptible wireless device;
coordinating interference among the interference-susceptible wireless devices at the wireless access point by a single centralized coexistence interference manager (CIM);
determining a channel change to communicate with the network; and
changing communication according to the determined channel change to increase the signal integrity metric so that an access point signal quality exceeds a minimum access point signal quality.

17. The method of claim 16, wherein the channel change includes a change in at least one of a frequency band, a timeslot, a transmission time interval, and a code-space.

18. The method of claim 16, wherein the signal integrity metric includes at least one of a data retransmission probability, a signal-to-noise ratio, a throughput, a time delay profile, and a signal-to-interference ratio.

19. The method of claim 16, wherein the access point signal quality comprises at least one of a packet retransmission probability, a bit error ratio, a parity bit, a checksum, a signal-to-noise ratio, a throughput, a packet error rate, and a signal-to-interference ratio.

20. The method of claim 16, wherein the first RF signal includes a data packet.

21. The method of claim 20, wherein changing the channel occurs before transmitting the data packet.

22. The method of claim 20, wherein changing the channel occurs while transmitting the data packet.

23. The method of claim 16, wherein the second RF signal includes an incoming data packet.

24. The method of claim 16, wherein the channel change includes at least one of an access point change, physical channel change, and access point interface change.

25. The method of claim 16, wherein the channel change is based on a user experience metric for a combined experience of concurrently using multiple mutually interfere-able wireless devices.

26. The method of claim 16, wherein the channel change includes a channel combination change in at least two mutually interference-susceptible wireless devices.

27. A wireless communications controller, comprising:
a wireless transceiver that communicates with a network through an access point on a channel of a first RF signal that propagates through an RF environment shared by a plurality of interference-susceptible wireless devices; and
a single coexistence interference manager (CIM) configured to coordinate interference among the interference-susceptible wireless devices, the CIM includes:
an interference determination module configured to determine that the first RF signal decreases a signal integrity metric for a second RF signal transmitted from a first to a second interference-susceptible wireless device and determine a channel change over which the transceiver can communicate with the network; and
a channel adjuster configured to change the channel accordingly to increase the signal integrity metric so that an access point signal quality exceeds a minimum access point signal quality.

28. The wireless communications controller of claim 27, wherein the interference-susceptible wireless devices include at least one of a cell phone, a WiFi device, a WiMAX device, a Bluetooth (BT) device, a Wibree device, a ZigBee device, a Wireless USB device, an ultra-wideband (UWB) device, an EnOCean device, a 6loWPAN device, an iBurst device, and a global positioning system (GPS).

29. The wireless communications controller of claim 27, wherein the signal integrity metric includes at least one of a data retransmission probability, a signal-to-noise ratio, a throughput, a time delay profile and a signal-to-interference ratio.

30. A user equipment for use in a shared radio frequency (RF) environment, comprising:
an RF interface that receives and transmits radio signals within the shared RF environment through an access point using an RF signal, wherein the shared RF environment comprises at least two different wireless services, the RF interface configured to communicate with a single centralized coexistence interference manager (CIM) that is configured to coordinate interference among the at least two different wireless services;
an interference identifying module associated with the RF interface that identifies an interference of signals that are communicated in the at least two different wireless services; and
a channel adjuster configured to determine a request to at least one of the wireless services to make a channel selection that mitigates the identified interference before a transceiver of the RF interface transmits a data packet included in the RF signal so that an access point signal quality exceeds a minimum access point signal quality.

31. The user equipment of claim 30, wherein the channel selection includes at least one of a positive channel selection and a negative channel selection.

32. The user equipment of claim 30, wherein the channel selection includes a change in at least one of a frequency band, a timeslot, a transmission time interval, and a codespace.

33. The user equipment of claim 30, wherein the user equipment is further configured to send the request before a connection of one of the wireless services.

34. The user equipment of claim 30, wherein the user equipment is configured to send the request during a connection of one of the wireless services.

35. The user equipment of claim 30, wherein the wireless services comprise at least one of a GSM network, a UMTS network, a LTE network, a WiMax network, and a WiFi network.

36. The user equipment of claim 30, wherein the interference identifying module is further configured to detect coexistence interference of the at least two wireless services based on a look-up table.

37. The user equipment of claim 30, wherein the interference identifying module is further configured to detect coexistence interference based on measurements of received RF signals from the RF interface.

38. The user equipment of claim 30, wherein the request is transmitted by the RF interface.

39. The user equipment of claim 30, wherein the request is transmitted by a transmitter other than the RF interface.

40. The user equipment of claim 30, wherein the request is directed to one of the wireless services.

41. The user equipment of claim 30, wherein the request is directed to a remote server to initiate a channel change.

42. The user equipment of claim 30, wherein the request is in the form of interference information to a remote server.

43. The user equipment of claim 30, wherein the channel selection includes at least one of an access point change, physical channel change, and access point interface change.

44. The user equipment of claim 30, wherein the request is based on a user experience metric for a combined experience of concurrently using multiple mutually interfere-able wireless devices.

\* \* \* \* \*